Figure 1:
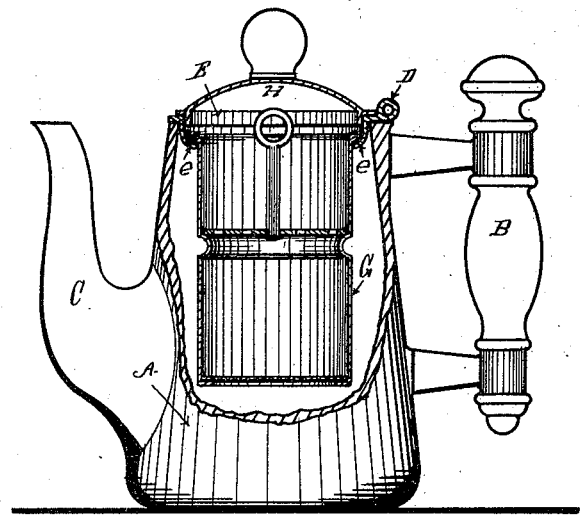

M. GRISWOLD, Jr.
COFFEE POT.
APPLICATION FILED SEPT. 16, 1910.

1,000,513.

Patented Aug. 15, 1911.

Witnesses

Inventor.
Matthew Griswold Jr.

UNITED STATES PATENT OFFICE.

MATTHEW GRISWOLD, JR., OF ERIE, PENNSYLVANIA.

COFFEE-POT.

1,000,513.      Specification of Letters Patent.      Patented Aug. 15, 1911.

Application filed September 16, 1910. Serial No. 582,327.

*To all whom it may concern:*

Be it known that I, MATTHEW GRISWOLD, Jr., a citizen of the United States, residing at Erie, in the county of Erie and State of Pennsylvania, have invented certain new and useful Improvements in Coffee-Pots; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in coffee-pots, and comprises substantially the construction and combination with the top of the coffee-pot, of a hinged flange adapted to rest upon the top of the coffee-pot and upon which the cover of the pot closes. The object of this construction is to form an internal flange in the top of the pot body for the purpose of sustaining a coffee receptacle, which flange can be moved up out of the way when the inside of the pot is being scoured and cleaned.

Figure 2:
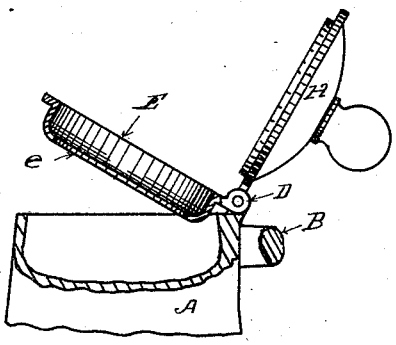
Figure 3:
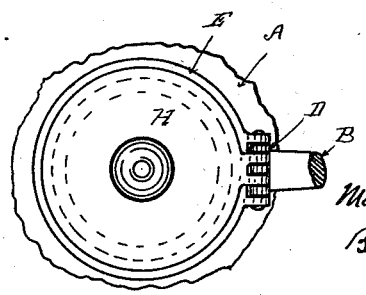

The features of my invention are hereinafter fully set forth and explained, and illustrated in the drawings, in which:

Figure 1 is a view in elevation of a coffee-pot embodying my invention with a portion thereof in section. Fig. 2 is a sectional view of the upper part thereof. Fig. 3 is a top or plan view of a portion of the pot.

In these drawings, A, is the body, B, the handle, and C, the spout of a coffee-pot. Upon the top of the pot upon the side thereof next to the handle, I form one member of a hinge, D. This member of the hinge, D, is so formed that it will receive corresponding parts on a flange-ring, E, and upon a cover, H, as is clearly shown in Fig. 3. This flange-ring, E, so supported by the hinge, D, fits down into the top of the pot, A, and is provided with an inwardly projecting annular flange, e, to receive and support the coffee receptacle, G, which hangs suspended therefrom, as shown in Fig. 1. The cover, H, being also supported by the hinge, D, fits down upon the top of the flange-ring, E, as illustrated in Fig. 1.

In construction and operation, the inside of the coffee-pot, being free from all obstructions can be readily and perfectly finished, and in scouring and cleaning the pot, the flange-ring can be raised up and turned back out of the way so that unobstructed access can be had to all parts of the inside of the pot.

Having thus described my invention so that others can construct and use the same what I claim as new and desire to secure by Letters-Patent is:

The combination in a coffee-pot, of a coffee-pot body, a ring hinged to the top thereof adapted to fit closely into the opening thereof and having a circumferential flange at the upper side thereof adapted to fit down upon the top of said pot and an inwardly turned annular flange at its lower side, a coffee-holder having an outwardly turned circumferential flange at its upper end insertible through and supported by said ring, and a cover hinged to the ring hinge pivot adapted to fit down upon said ring, substantially as set forth.

In testimony whereof I affix my signature, in presence of two witnesses.

MATTHEW GRISWOLD, JR.

Witnesses:
    H. M. STURGEON,
    P. B. GIFFORD.

---

Copies of this patent may be obtained for five cents each, by addressing the "Commissioner of Patents, Washington, D. C."